United States Patent [19]
Perry

[11] Patent Number: 5,116,279
[45] Date of Patent: May 26, 1992

[54] FISH FILLETING APPARATUS

[75] Inventor: James G. Perry, Omaha, Nebr.

[73] Assignee: Advanced Innovations Inc., Omaha, Nebr.

[21] Appl. No.: 484,263

[22] Filed: Feb. 26, 1990

[51] Int. Cl.⁵ ............................................. A22C 25/06
[52] U.S. Cl. ........................................ 452/195; 452/194
[58] Field of Search ............................. 452/195, 194

[56] References Cited

U.S. PATENT DOCUMENTS

| | | | |
|---|---|---|---|
| D. 264,531 | 5/1982 | Trode | D6/179 |
| 2,825,928 | 3/1954 | Thornton | 17/7 |
| 2,932,849 | 4/1960 | Missman | 17/8 |
| 3,237,240 | 3/1966 | Bednar et al. | 17/8 |
| 3,908,231 | 9/1975 | Price et al. | 17/70 |
| 4,030,164 | 6/1977 | Fick | 17/70 |
| 4,112,547 | 9/1978 | Glushkov et al. | 17/57 |
| 4,454,630 | 6/1984 | Shouldis | 452/195 |
| 4,513,526 | 4/1985 | Grace et al. | 43/57.2 |
| 4,704,769 | 11/1987 | Hanechak et al. | 17/46 |

Primary Examiner—Willis Little

[57] ABSTRACT

A fish cleaning apparatus includes an elongated table having a clamp generally centered along the length thereof for engaging the tail of a fish so that the clamped fish may be supported on either side of the table for cleaning one side of the fish and then flipped onto the other side of the table for cleaning the other side of the fish. A securement strap disengageably connected to the jaw of the fish secures the fish on the table during the cleaning operation at either end of the table and facilitates removal and disposal of the fish carcass without any direct handling of it.

24 Claims, 10 Drawing Sheets

FISH FILLETING APPARATUS

BACKGROUND OF THE INVENTION

The present invention is directed generally to what is commonly referred to as a fish cleaning board, a device for holding a fish so that it may be readily skinned, scaled or filleted. The invention is further directed for a new method of filleting a fish.

It is common for fishermen to use an elongated board or panel for supporting a fish to be cleaned either by skinning, scaling or filleting. Commercially available boards are known which further provide clipboard-like clamp at one end. The tail of the fish is clamped with the fish stretched out across the board for cutting one fillet or skinning or scaling one side of the fish, whereupon the clamp is released and the fish must be handled and turned over and re-clamped prior to cutting the fillet or skinning or scaling the other side of the fish. Other devices provide various means for securing a fish to a board at the head and tail ends.

Fish cleaning generally is the least attractive part of the sport of fishing and is so repulsive to some individuals as to deter them from fishing altogether. Direct handling of the fish and its innards during the cleaning operation is the biggest drawback. The difficulty of securing a fish while cleaning it adds to the problem.

Accordingly, a primary object of the invention is to provide an improved fish cleaning method and apparatus.

Another object is to provide a fish cleaning apparatus which enables a single clamping of a fish's tail to serve for holding the fish where cleaning both sides of the fish so that minimal handling of the fish is required for the complete cleaning operation.

Another object is to provide a fish cleaning apparatus which enables cleaning of a fish without handling of the carcass and without cutting off the head, tail and gutting the fish.

Another object is to provide a fish cleaning apparatus which facilitates and expedites the cleaning of a fish.

Another object is to provide a fish cleaning apparatus which is safe to use and instructional for easy learning by first-time users.

Another object of the invention is to provide an improved fish cleaning method which minimizes handling of the fish and simplifies and expedites the cleaning operation.

Finally, an object is to provide a fish cleaning apparatus which is simple and rugged in construction, inexpensive to manufacture and efficient in operation.

SUMMARY OF THE INVENTION

The fish cleaning apparatus of the present invention includes an elongated table having front and back edges and opposite ends. A clamp is mounted on the table in substantial spaced relation from both ends thereof so that upon clamping the tail of a fish to be cleaned, the clamped fish may be supported on either side of the table for cleaning one side of the fish, after which the fish may be flipped onto the other side of the table for cleaning the other side of the fish. The table can simply be moved to a position above a refuse container for opening the clamp and releasing the carcass without any further handling of it.

The clamp preferably opens at the top and may be arranged below the surface of the table out of the way of the cleaning operation. In that case, the clamp is aligned with a transverse slot through the tabletop for receiving and clamping the tail of a fish inserted through the slot.

The slot is preferably generally centered between the opposite ends of the table so that ample space is provided on both sides of the slot for cleaning respective sides of a clamped fish. Legs may be provided to support the table above a support surface to afford room for the clamp and those legs may be pivotally mounted for compact storage and transport when the table is not in use. Likewise, the table may be hinged along an axis intersecting the center slot to further collapse the table when not in use.

To secure the fish onto the table during the cleaning operation, a fish retention strap is preferably providing having a hook at one end for disengageable connection to the jaw of the fish. Coacting length adjustable fasteners on the strap and table enable the hooked strap to be stretched toward one end of the table and secured thereto while cleaning one side of the fish, after which the strap may be disengaged, stretched toward the opposite end of the table and secured thereto while cleaning the opposite side of the fish. The preferably bullet shaped hook facilitates insertion into a fish's mouth and engagement of the hook onto the lower jaw of the fish with minimal handling of the fish.

A preferred clamp includes a fixed jaw secured to the underside of the table on one side of the slot, a base frame secured to the underside of the table on the opposite side of the slot, a moveable jaw slidable longitudinally of the base frame between clamping an open positions, a clamp handle connected to the moveable jaw and bias means for urging the moveable jaw toward the clamping position. Coacting stop means on the base frame and moveable jaw limits sliding movement of the moveable jaw toward and away from the fixed jaw. A fixed handle may be provided adjacent the clamp handle so that squeezing of the clamp handle toward the fixed handle results in opening of the clamp.

The cleaning of small pan fish may be facilitated by providing a flip arm pivotally connected to the table adjacent the clamp such that the strap hooked to the fish may be connected to the flip arm and remain engaged thereto as the flip arm is pivoted from one side of the table to the other for cleaning both sides of the fish. The flip arm may be supported in a vertical position to facilitate completion of the cleaning of each side of the fish.

Finally, the invention is directed to the novel method of cleaning a fish using the clamped table apparatus of the invention.

DESCRIPTION OF THE PREFERRED EMBODIMENTS

The fish cleaning apparatus 10 of the invention is illustrated in FIGS. 1-7 in connection with a preferred embodiment, including an elongated table 12 having front and back edges 14 and 16 and opposite ends 18 and 20. The table is supported above a support surface by legs 22 which, in the illustrated embodiment, are integrally formed with a peripheral flange 24 depending from the underside of table 12.

A clamp 26 is mounted on the table at a position in substantial spaced relation from both ends of the table so that a clamped fish may be supported on either side of the table for cleaning one side of the fish and then flipped onto the other side of the table for cleaning the other side of the fish. So as not to interfere with the cleaning operation, clamp 26 is preferably mounted on the underside of table 12, as shown on FIGS. 6 and 7, in alignment with a transversely extended slot 28 through the tabletop. The slot is preferably centered between the opposite ends of the table.

Figures 1, 2:
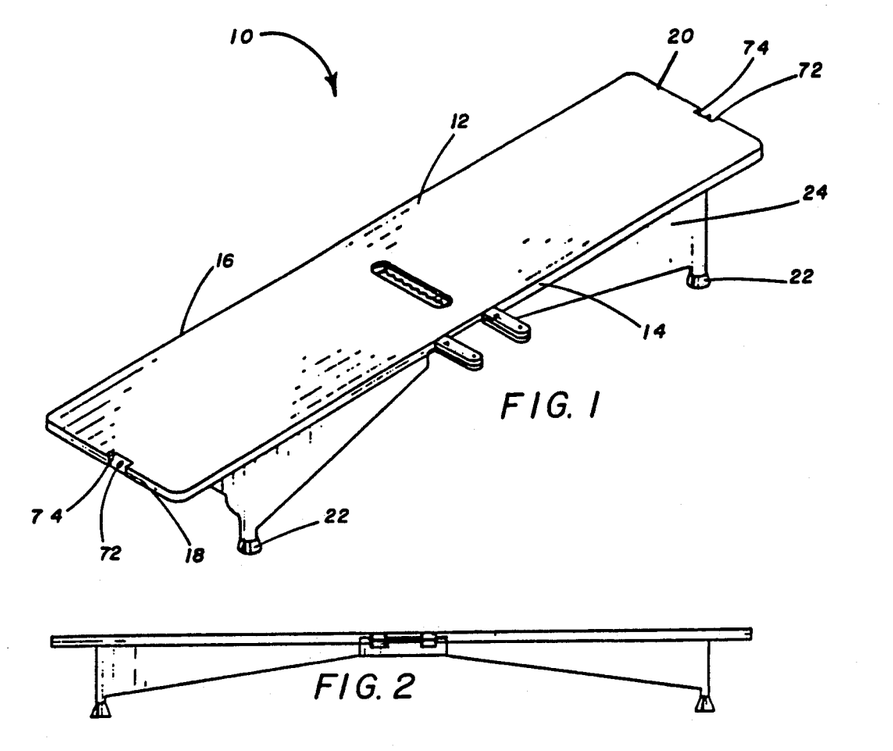
FIG. 1 is a perspective view of one embodiment of the invention.
FIG. 2 is a front elevational view thereof.
Figure 3:
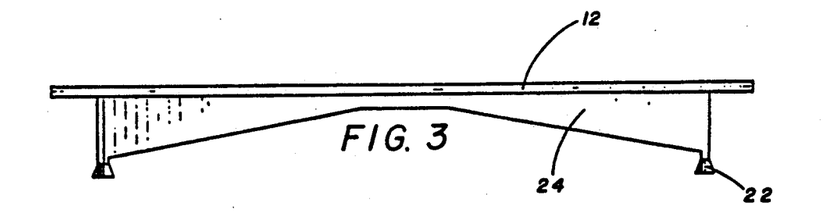
FIG. 3 is a rear elevational view thereof.
Figure 4:
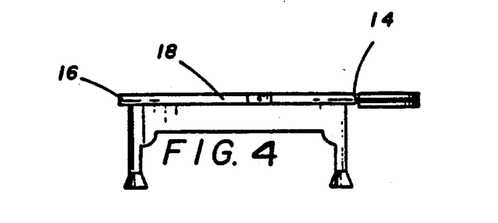
FIG. 4 is a left end view thereof.
Figure 5:
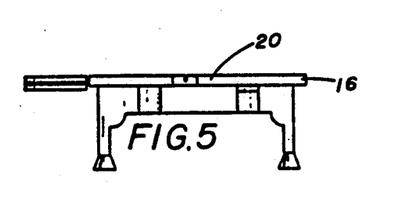
FIG. 5 is a right end view thereof.
Figure 6:
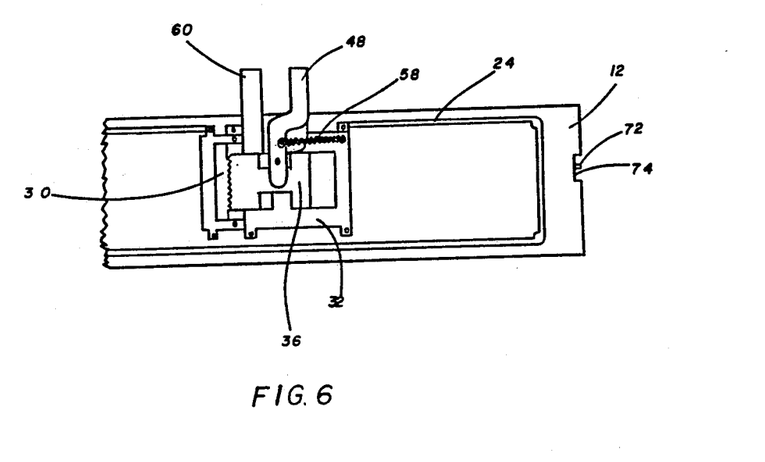
FIG. 6 is a partial bottom view thereof showing the clamp mechanism.
Figure 7:
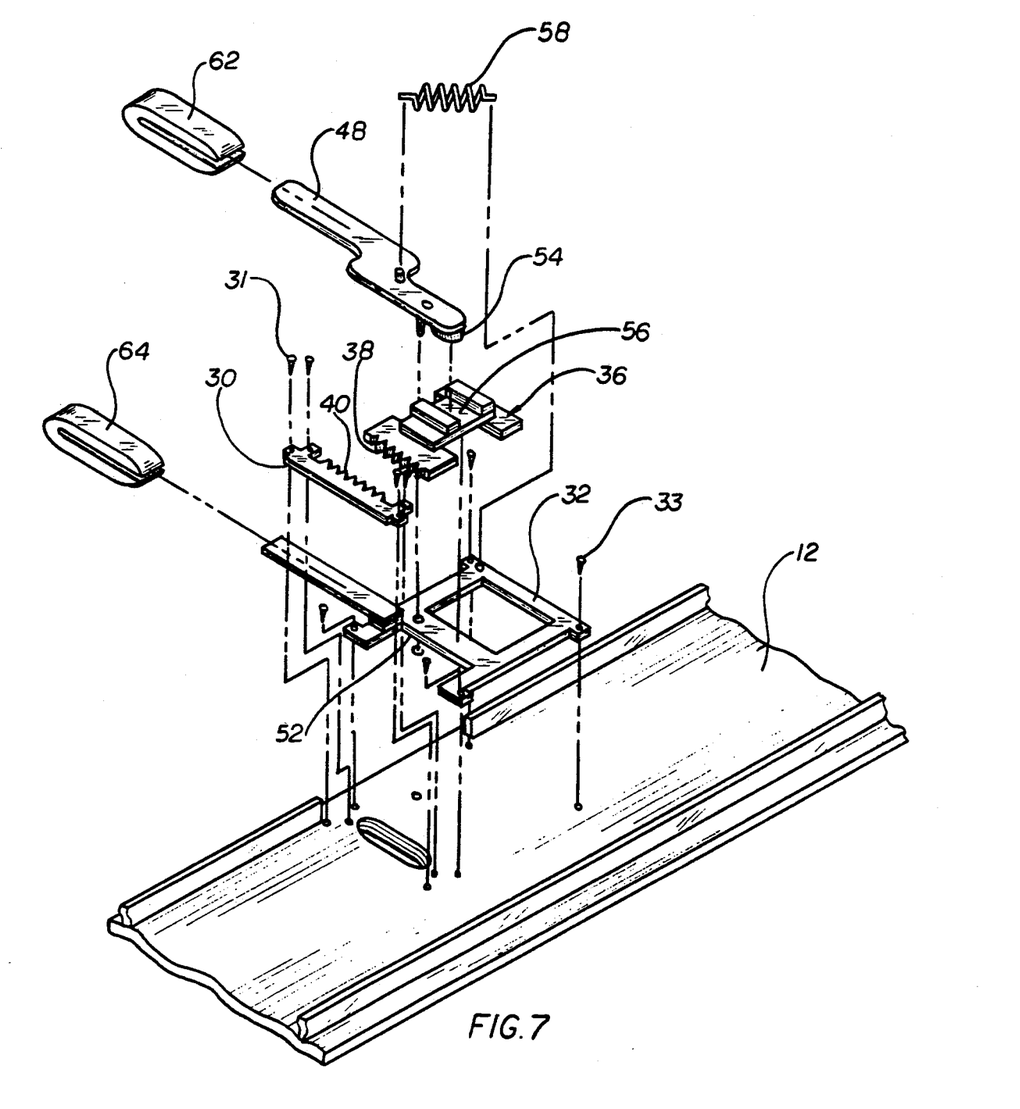
FIG. 7 is an exploded bottom view of the clamp mechanism on the underside of the table.

Clamp 26 includes a fixed jaw 30 secured to the underside of table 12 by screws 31 or any other suitable fastening means. Fixed jaw 30 is arranged on one side of slot 28. On the other side of the slot, a base frame 32 is secured to the underside of the table by screws 33 or any other appropriate fasteners. Base frame 32 is shown as a generally A-shaped member having a crossbar 34 onto which a generally H-shaped moveable jaw 36 is placed for back and forth sliding movement. Moveable jaw 36 has a toothed edge 38 adapted for engagement against a matching toothed edge 40 of fixed jaw 30 the shape of the teeth is not critical to the invention and may be altered to accommodate the most effective grip of a fish tail.

Moveable jaw 36 has a raised crossbar 42 connecting the parallel legs 44 and 46 so that the legs are slidable on opposite sides of the base frame crossbar 34. Engagement of the legs 44 and 46 with opposite edges of the base frame crossbar 34 effectively limits the range of movement of moveable jaw 36 between a clamping position adjacent fixed jaw 30 and an open position in spaced relation from the fixed jaw for receiving the tail of a fish inserted through table slot 28.

A clamp handle 48 is pivotally connected to base frame 32 such as by a depending pivot pin 50 received in an appropriate pin hole 52 in the base frame. Pin 50 is spaced from the interior end of clamp handle 48 which carries a generally circular cam pin 54 on the underside thereof. Cam pin 54 is received within a transverse cam slot 56 on moveable jaw across bar 42 for back and forth sliding movement of moveable jaw 36 in response to pivotal movement of clamp handle 48.

A tension spring 58 is connected between the clamp handle 48 and base frame 32 for urging the clamp handle in a direction to bias the moveable jaw toward its clamping position.

A fixed handle 60 may be secured to the base frame and project forwardly therefrom at a position such that squeezing movement of the clamp handle 48 toward fixed handle 60 results in movement of the moveable jaw 36 to its open position. Appropriate handle grips 62 and 64 are provided for the clamp handle 48 and fixed handle 60 respectively.

Figure 8:
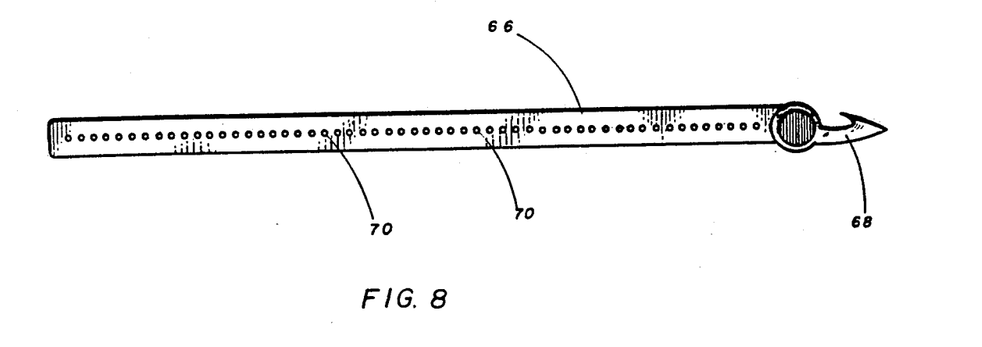
FIG. 8 is a planned view of the hooked strap of the invention.
Figure 9:
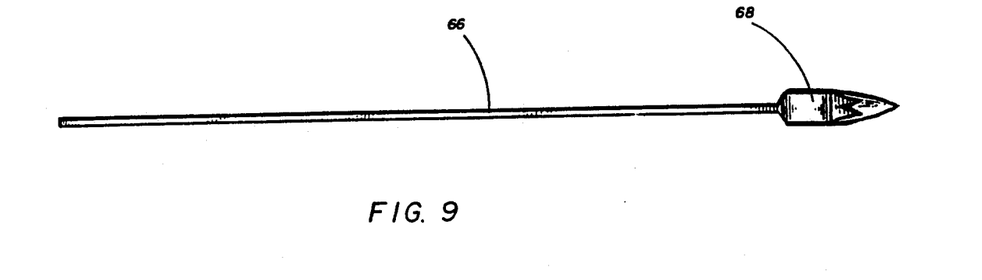
FIG. 9 is a side view of the hooked strap.

FIGS. 8 and 9 illustrate a fish retention strap 66 having a hook 68 at one end for disengageable connection to the head end of a fish and a plurality of spaced apart holes 70 along the length of the flexible strap. Whereas the illustrated strap is a flexible plastic strip, it may alternately be formed of a woven strap fabric, rod, cord, chain, or any other flexible tension member. The spaced holes 70 form part of a length adjustable fastening means for securing fish of different lengths onto the table 12. The other part of the coacting fastening means is a pair of pins 72 set within the recesses 74 in opposite ends of the table for engaging a selected strap hole 70 closest to the pin 72 upon stretching of the strap from a clamped fish toward the respective end of the table from which pin 72 protrudes. Recess 74 protects pins 72 and eliminates what otherwise might be a hazardous projection from the end of the table. Hook 68 is forwardly tapered and generally bullet-shaped to facilitate insertion into the closed mouth of a fish, as described below.

Figures 10, 11, 12, 13:
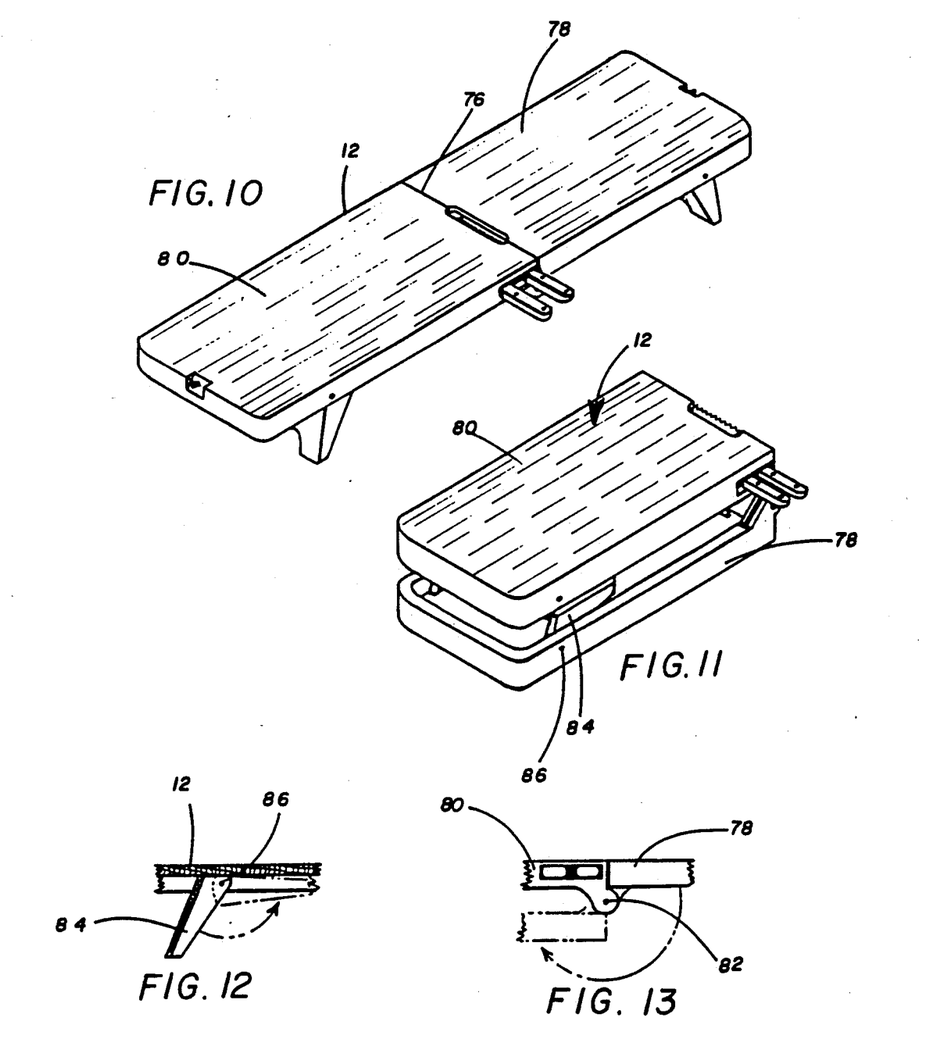
FIG. 10 is a perspective view of a hinged second embodiment of the invention.
FIG. 11 is a perspective view of the second embodiment in a collapsed storage position.
FIG. 12 is a partial sectional view of a pivotal table leg.
FIG. 13 is a partial detailed view of the hinged connection between table halves.

FIGS. 10-13 illustrate an alternate embodiment of the invention wherein the table 12' is split along line 76 into a right half 78 and left half 80. FIG. 13 illustrates that the two halves are hinged about an axis 82 which underlies slot 28. Accordingly, upon pivotal movement of the right half 78 from the solid line working position of FIG. 13 to the dotted line storage position of FIG. 13 and FIG. 11, fixed jaw 30 remains attached to the right half 78. To facilitate collapsing of the table in the storage position of FIG. 11, legs 84 are pivotally connected to the table 12' for pivotal movement about a respective transverse axis 86 between the solid line working position of FIG. 12 and the dotted line storage position.

In this or other embodiments, the table may be further modified to include a slot for receiving a filleting knife, a strap storage compartment, or any other accessories which may be helpful to store with the apparatus.

Figure 14:
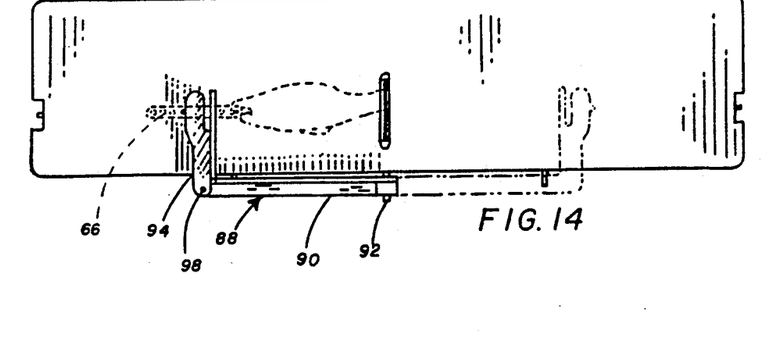
FIG. 14 is a top plan view of a table equipped with a flip arm of the invention.
Figure 15:
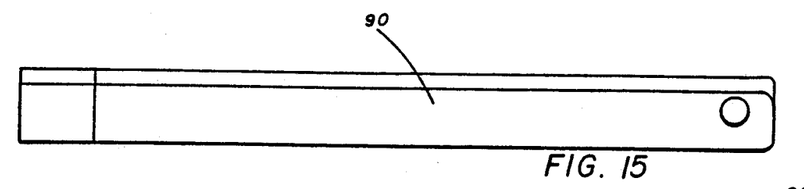
FIG. 15 is a top view of the main leg of the flip arm.
Figure 16:
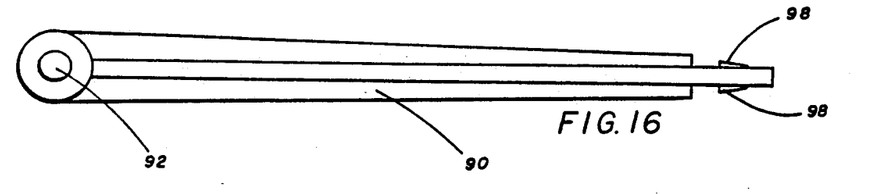
FIG. 16 is a rear view of the main leg of the flip arm.
Figure 17:
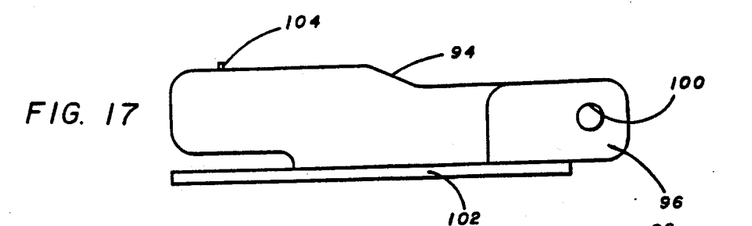
FIG. 17 is a top view of the hinged foot of the flip arm.
Figure 18:
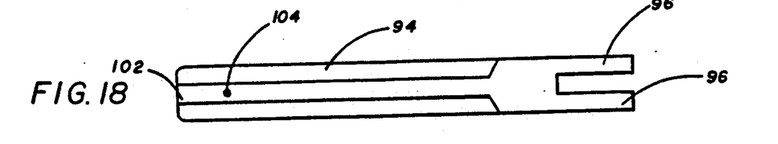
FIG. 18 is an end view of the hinged foot of the flip arm.

FIG. 14 through 18 illustrate a flip arm attachment 88 to facilitate the cleaning of small pan fish. Flip arm 88 includes a main leg 90 pivotally connected to table 12 for pivotal movement about a transverse axis 92 adjacent clamp 26 and preferably aligned with slot 28. A foot 94 is pivotally connected to the opposite end of leg 90 such as by snap fitting spaced apart perforated flanges 96 onto the free end of leg 90 with pivot posts 98 engaged within the flange holes 100. Foot 94 is thus pivotal from a position parallel to leg 90 to the perpendicular position illustrated in FIG. 14 where it projects forwardly across the table 12. In the perpendicular position, an end of edge plate 102 engages leg 90 to limit pivotal movement of the foot to the perpendicular position. The opposite end of edge plate 102 is slotted at 102 to accommodate insertion of the strap 66 therethrough, as shown in FIG. 14. The strap is stretched across the foot and secured therethrough by engagement of the nearest hole 70 onto pin 104 on the exterior side of foot 94. Thus the strapped fish can be flipped from one side of the table to the other, as indicated in the solid and dotted line positions of the flip arm 88 in FIG. 14. Furthermore, the flip arm may be arranged vertically for supporting the fish in an upright position to facilitate the final stage of cleaning each side of the fish. Appropriate spring means may be provided for supporting the flip arm in both lowered positions and the vertical upright position.

Figures 19, 20, 21, 22:
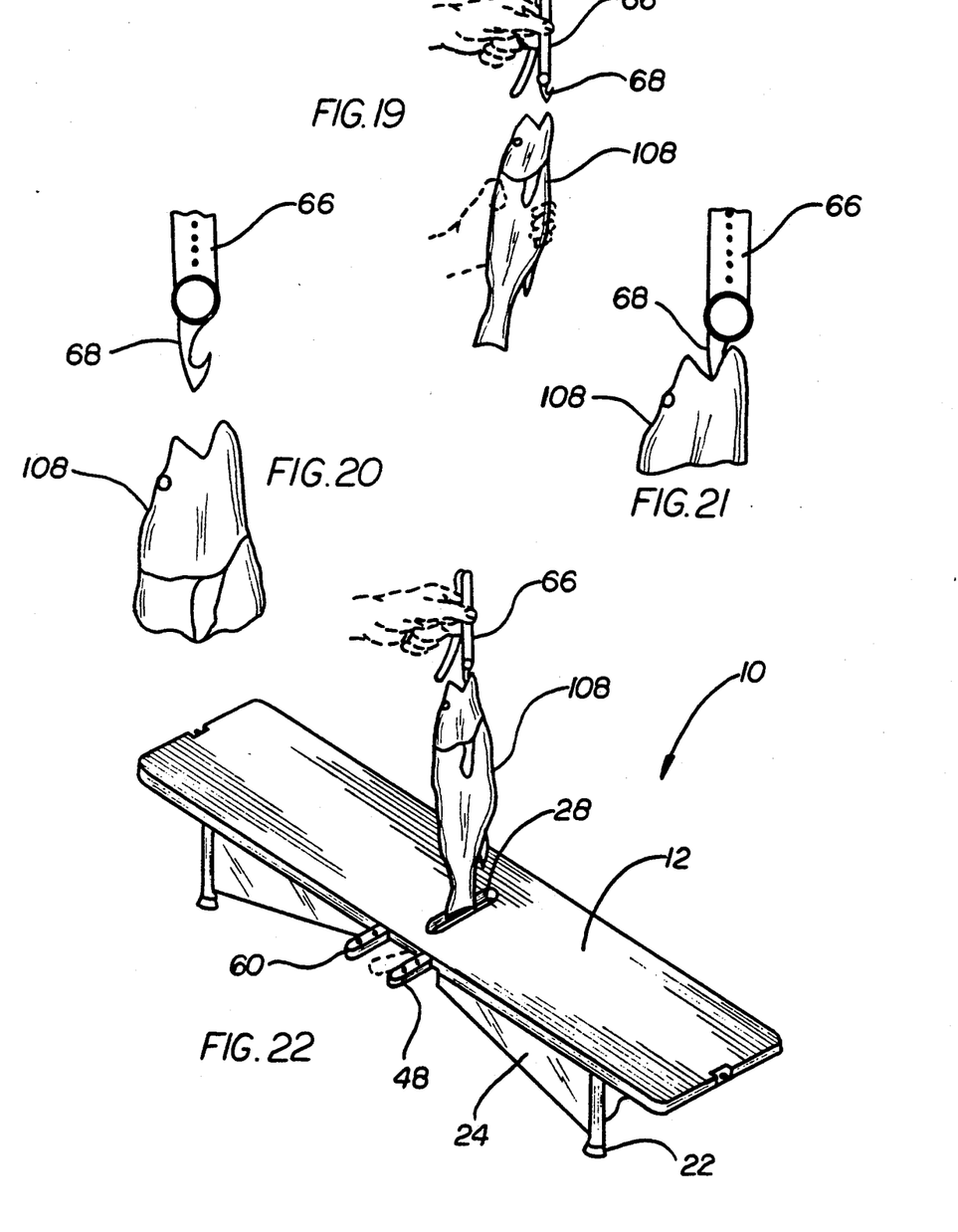
FIG. 19 illustrates the insertion Of the hook strap into the mouth of a fish.
FIG. 20 is a detailed view of the hook being inserted into the mouth of a fish.
FIG. 21 is a detailed view of the hook engaged on the lower jaw of a fish.
FIG. 22 is a perspective view of a hooked fish being lowered into the clamp of the invention.
Figure 23:
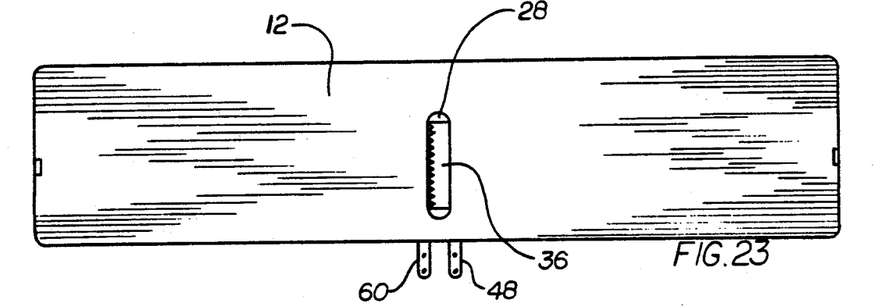
FIG. 23 is a top view of the invention showing the moveable clamp jaw in its clamping position.

The method of using the fish cleaning apparatus 10 is described with reference to FIGS. 19-35. Handling of the fish throughout the cleaning operation is minimized by attachment of the securement strap 66 to the mouth of the fish, as shown in FIGS. 19-21. The tapered bullet-shape of the hook facilitates insertion of the hook even into a closed mouth. A simple twisting of the hook to engage the hook onto the lower jaw of the fish, as shown in FIG. 21, sets the hook for supporting the fish and lowering it into the clamp of the apparatus, as shown in FIG. 2 without any further direct handling of the fish.

Figure 24:
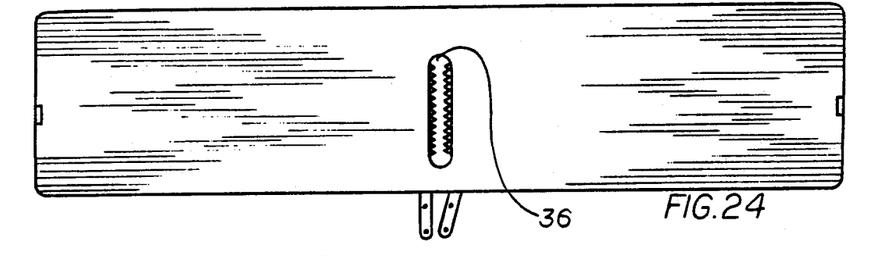
FIG. 24 is a top view of the invention showing the moveable clamp jaw in its open position.

To open the clamp 26, the clamp handle 48 is squeezed toward the fixed handle 60 as shown in FIG. 24 to move the moveable jaw 36 to its open position. Upon lowering of the tail of the fish into the clamp, the clamp handle 48 is released whereupon spring 58 closes the clamp for securely holding the tail end of the fish at the center of the table.

Figure 25:
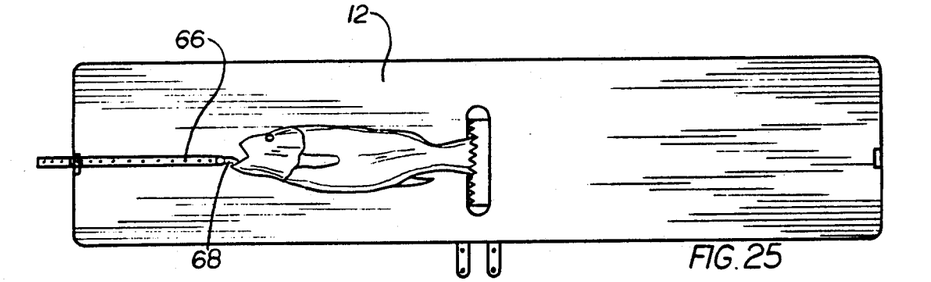
FIG. 25 is a top view showing a clamped fish strapped to one side of the table.

The fish is then laid onto the table on one side of the clamp, as shown in FIG. 25, whereupon strap 66 is stretched toward the adjacent end of table 12 for securement of the closest hole 70 onto the strap retention pin 72.

Figure 26:
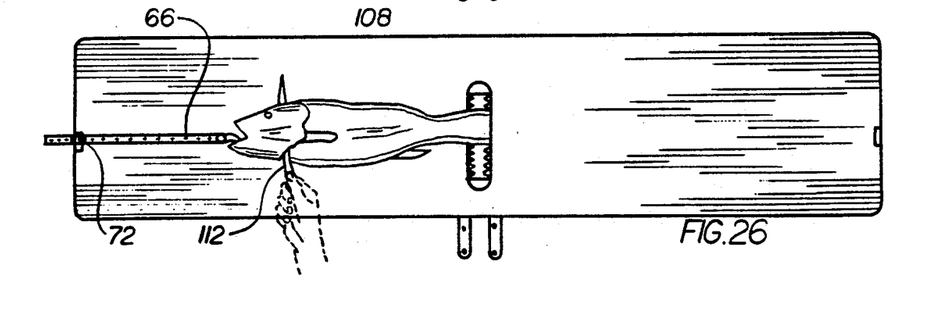
FIG. 26 is a top view showing the initial cut for cleaning one side of the fish.
Figure 27:
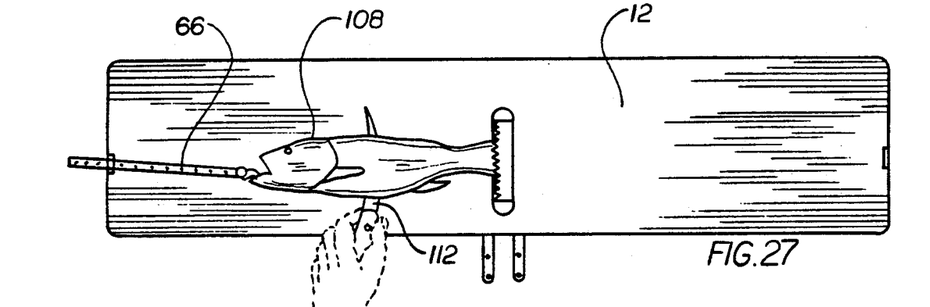
FIG. 27 is a top view showing the rearward cut for separating the edible flesh of the fish from the back bone.
Figure 28:
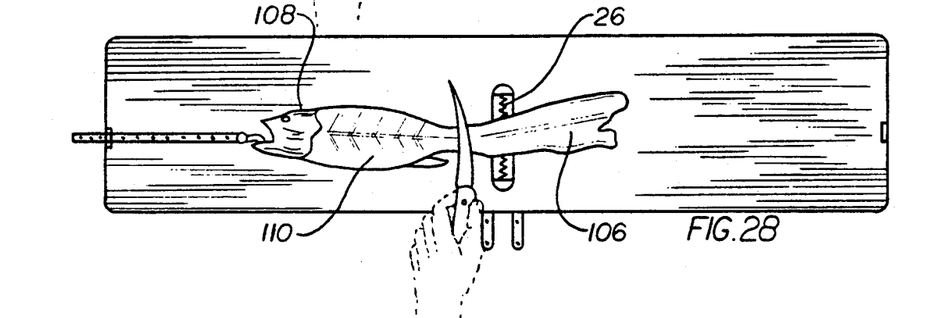
FIG. 28 is a top view showing the separated edible portion and still attached skin flipped onto the other side of the table.
Figure 29:
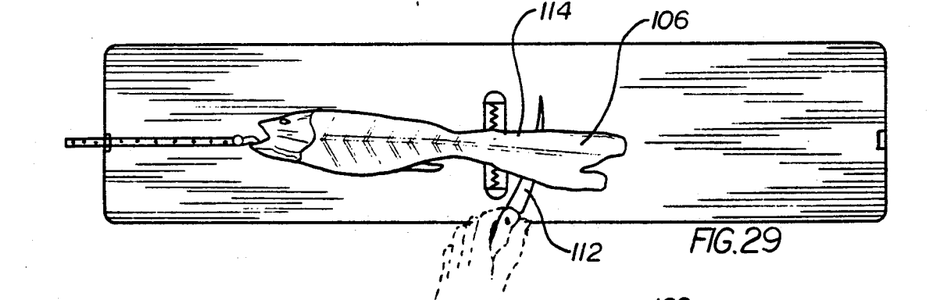
FIG. 29 shows the final cut for separating the edible flesh from the still attached skin.

Filleting of the fish is accomplished by cutting into the fish adjacent the head as illustrated in FIG. 26 and then cutting toward the tail as illustrated in FIG. 27 to separate the edible flesh portion 106 of fish 108 from the back bones 110, yet leaving the skin attached near the tail of the fish. Edible portion 106 is then flipped onto the table on the opposite side of the clamp, whereupon knife 112 cuts the previously separated edible portion of the skin 114. The separated edible portion then rinsed and saved.

Figure 30:
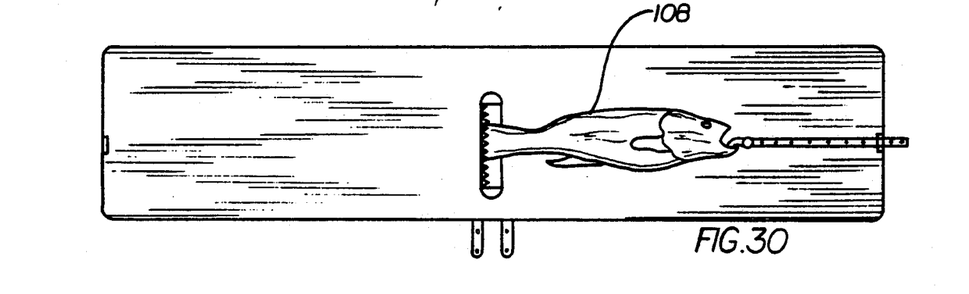
FIG. 30 shows the fish flipped onto the opposite side of the table.
Figure 31:
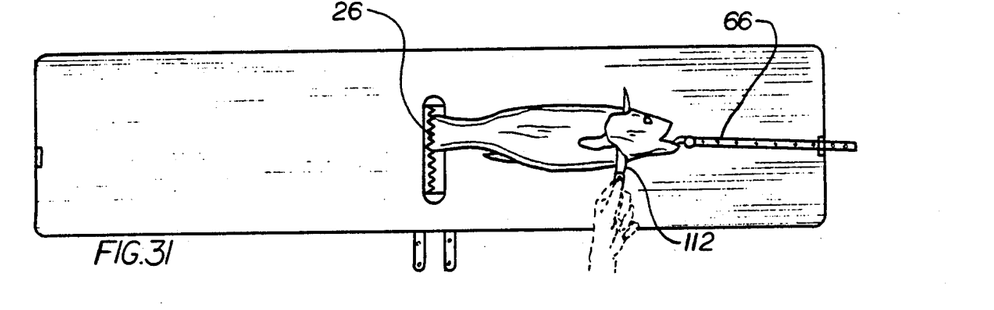
FIGS. 31 through 34 show the cuts for cleaning the opposite side of the fish.
Figure 32:
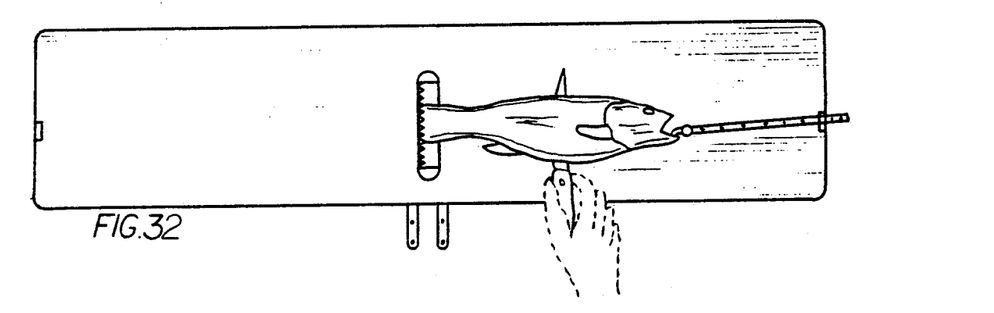
Figure 33:
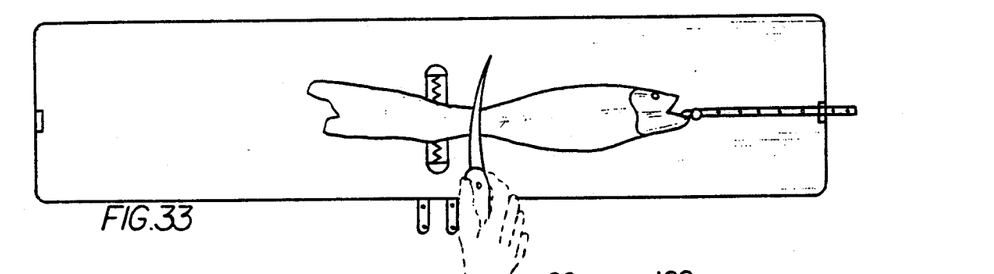
Figure 34:
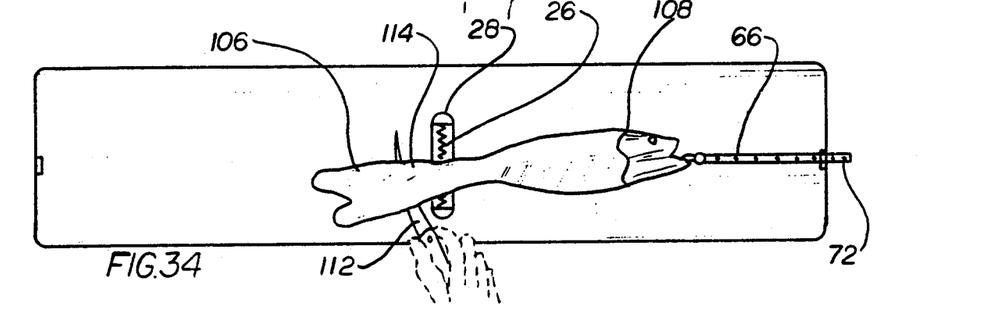

Cleaning of the opposite side of the fish is usually accomplished by simply disengaging strap 66, lifting the strap to flip the fish onto the table on the opposite side of the clamp as shown in FIG. 30 and resecuring the strap to the opposite end of the table. The cleaning operation proceeds with the initial cut adjacent the head as illustrated in FIG. 31 followed by the rearward cut toward the tail, as shown in FIG. 32 to separate the edible portion 106 while leaving the skin attached to the tail for flipping the separated flesh onto the table on the opposite side of the clamp, as shown in FIG. 33, so that the final cut of FIG. 34 can be made to separate the edible portion 106 from the skin.

Figure 35:
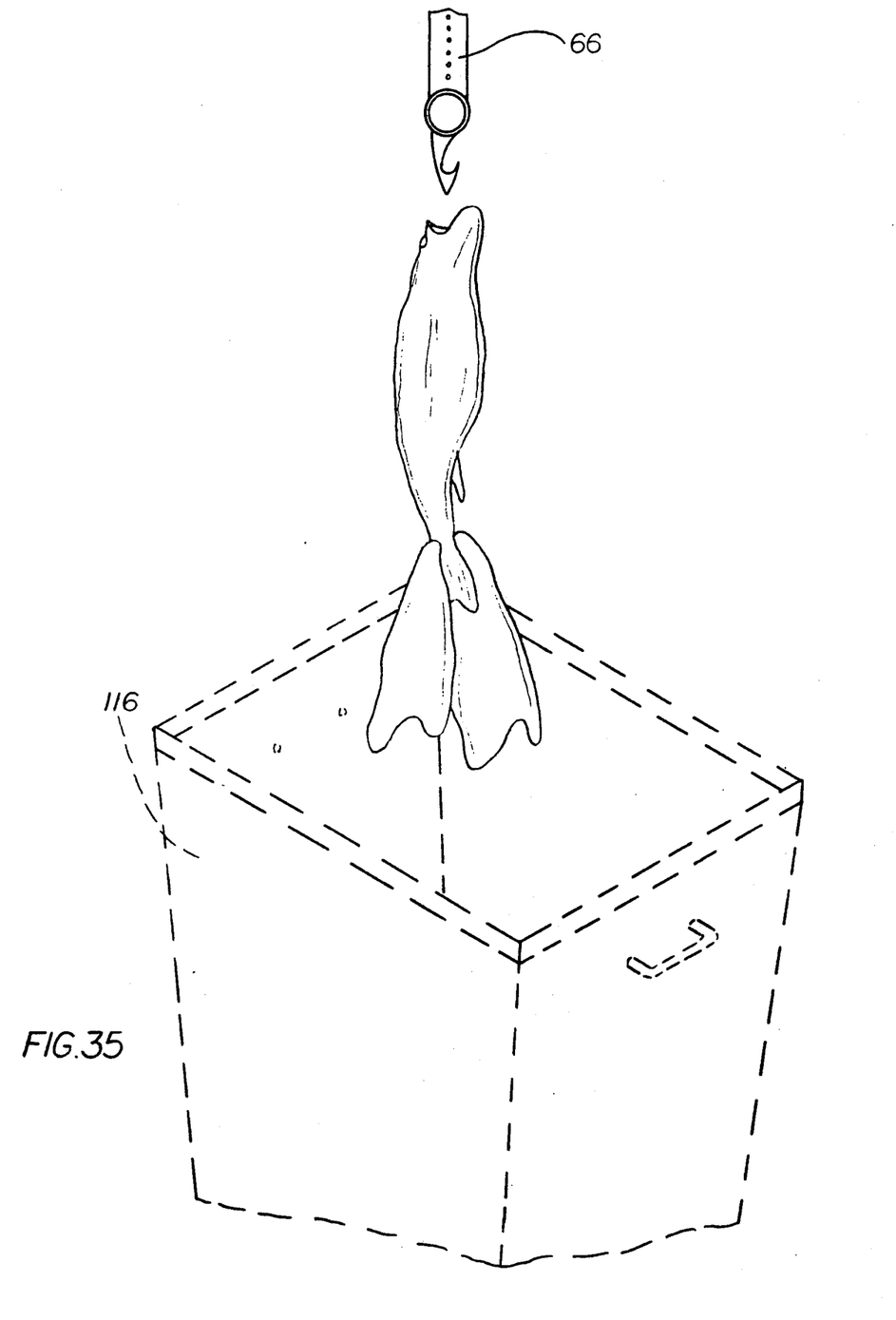
FIG. 35 shows the strap hook releasing the carcass into a trash receptacle.

At this point, the strap is disengaged from the table, the clamp 26 is opened and the carcass is raised on strap 66 and moved to a position above a trash receptacle 116, as shown in FIG. 35, whereupon the fisherman simply flips his wrist to disengage hook 68 from the fish carcass to drop it into the receptacle 116. Accordingly, a fish can be quickly and easily cleaned using the apparatus of the invention with minimal or no direct handling of the fish.

The cleaning of small pan fish is facilitated by the use of the flip arm attachment 88 described above. In that instance, the strap 66 need only be secured a single time to the foot 94 for movement of the fish to either side of the table by pivotal movement of the flip arm 88. Because of the small size of the fish, it may be helpful to support the flip arm in a vertical position when separating the flesh portion of the fish from the skin in the final stage of the cleaning operation.

Whereas the cleaning operation has been described in connection with filleting of a fish, it is apparent that the apparatus will likewise securely support the fish for skinning, scaling, or other cleaning of the fish with minimal direct handling of the fish. It is expected that this will be most attractive to people who love to fish, but hate to clean their catch.

Whereas the invention has been described in connection with the preferred embodiments thereof, it is apparent that many modifications, additions and substitutions may be made which are within the intended broad scope of the appended claims. For example, whereas a molded plastic table 12 may be provided, a wood board or metal plate may be substituted as desired. Whereas size is not critical to the invention, it is preferred that the tabletop be of a size to accommodate the cleaning of most common fish. One suitable tabletop has a length of thirty-two inches (32") and a transverse width of nine inches (9"). Illustrated cleaning instructions may be displayed on the table top, perhaps along the rearward edge, to provide readily available instructions that will not be lost or separated from the table.

Whereas the flip arm attachment 88 is illustrated in FIG. 14 on the forward side of table 12, it may alternately be mounted on the rearward side, so as not to interfere with the cleaning operation and so as not to obstruct access to the handles protruding from the front of the table.

Whereas it is anticipated that the primary use of the invention will be for cleaning fish, it may have use for securing other animals such as frogs and rabbits, for example for skinning, dissecting or the like.

Thus there has been shown and described a fish cleaning apparatus and method which accomplish the stated objects.

I claim:

1. A fish cleaning apparatus comprising,
   an elongated table having front and back edges and opposite ends, and
   a clamp operative to releasably receive and hold the tail of a fish to be cleaned,
   said clamp being mounted on said table so as to releasably receive and hold the tail of a fish at a position in substantial spaced relation from both ends of said table whereby a clamped fish may be supported on either side of said table for cleaning on side of the fish and then flipped onto the other side of the table for cleaning the other side of the fish,
   said clamp being mounted so as to open at the top for receiving the tail of a fish held upright and lowered into the clamp,
   said clamp including at least one handle protruding therefrom, said handle being reciprocally moveable in opposite directions for opening and closing said clamp.

2. The fish cleaning apparatus of claim 1 wherein said clamp includes means biasing said handle in a direction for closing said clamp.

3. The fish cleaning apparatus of claim 1 wherein said table has a transversely extended slot therethrough, said clamp being mounted on the underside of said table in alignment with said slot for releasably receiving and holding the tail of a fish inserted therethrough.

4. The fish cleaning apparatus of claim 3 wherein said slot is generally centered between opposite ends of said table.

5. The fish cleaning apparatus of claim 3 wherein said table includes a fish cleaning board and leg means projecting downwardly therefrom for supporting said board in sufficient raised relation to a support surface to accommodate said clamp between said board and support surface.

6. The fish cleaning apparatus of claim 5 wherein said leg means comprises a plurality of legs and means for connecting said legs to said board for pivotal movement between working and storage positions.

7. The fish cleaning apparatus of claim 5 wherein said board includes right and left portions and hinge means connecting said right and left portions together for pivotal folding movement about a transverse axis through said slot whereby said board may be collapsed for compact transport and storage.

8. The fish cleaning apparatus of claim 1 further comprising a fish retention strap having a hook at one end for disengageable connection to the head end of a fish to be clamped onto the apparatus and coacting length adjustable fastening means on said table and strap for securing fish of different lengths onto said table.

9. The fish cleaning apparatus of claim 8 wherein said hook is generally bullet shaped having a tapered end to facilitate insertion into the closed mouth of fish.

10. The fish cleaning apparatus of claim 8 wherein said coacting fastening means comprises a pin means protruding from at least one end of said table and a plurality of longitudinally spaced apart holes in said strap for insertion of said pin means through a selected strap hole closest to said pin means upon stretching of said strap from a clamped fish toward the end of the table from which said pin means protrudes.

11. The fish cleaning apparatus of claim 3 wherein said clamp includes
    a fixed jaw secured to the underside of said table on one side of said slot,
    a base frame secured to the underside of said table on the opposite side of said slot,
    a movable jaw slidable longitudinally of said base frame for movement between a clamping position adjacent said fixed jaw and an open position in spaced relation from said fixed jaw whereby the tail of a fish inserted through said slot is inserted between said jaws,
    a clamp handle connected to said movable jaw and projecting from said table for moving said movable jaw between the clamping and open positions thereof, and
    bias means operatively connected to said base frame and movable jaw for urging said movable jaw toward said clamping position.

12. The fish cleaning apparatus of claim 11 wherein said base frame and movable jaw include coacting stop means operative to limit sliding movement of said movable jaw toward and away from said fixed jaw.

13. The fish cleaning apparatus of claim 12 wherein said clamp handle is pivotally connected to said base frame and includes a cam pin engaged within a cam slot in said movable jaw for slidably moving said movable jaw in response to pivotal movement of said handle.

14. The fish cleaning apparatus of claim 13 wherein said bias means comprises a tension spring connected to and extended between said clamp handle and base frame.

15. The fish cleaning apparatus of claim 14 wherein said clamp further comprises a fixed handle projecting from said base frame in spaced relation from said clamp handle at a position such that movement of said clamp handle toward said fixed handle causes movement of said movable jaw toward the open position thereof.

16. A fish cleaning apparatus comprising,
    an elongated table having front and back edges and opposite ends, and
    a clamp operative to releasably receive and hold the tail of a fish to be cleaned,
    said clamp being mounted on said table so as to releasably receive and hold the tail of a fish at a position in substantial spaced relation from both ends of said table whereby a clamped fish may be supported on either side of said table for cleaning one side of the fish and then flipped onto the other side of the table for cleaning the other side of the fish,
    a fish retention strap having a hook at one end for disengageable connection to the head end of a fish to be clamped onto the apparatus and coacting length adjustable fastening means on said table and strap for securing fish of different lengths onto said table, and
    a flip arm, including a leg having one end pivotably connected to said table for pivotal movement about a transverse axis adjacent said clamp, and a foot connected to the opposite end of said leg and extending over said table, said foot including coacting fastening means operative for length adjustable connection of said strap thereto whereby a fish strapped to said flip arm and lying on said table on one side of said clamp is moved onto the opposite side of the clamp in response to pivotal movement of said flip arm.

17. A fish cleaning apparatus of claim 16 wherein said foot includes a strap receiving slot in association with said coacting fastening means.

18. The fish cleaning apparatus of claim 17 wherein said coacting fastening means comprises a pin means protruding from said foot adjacent said strap receiving slot and a plurality of longitudinally spaced apart holes in said strap for insertion of said pin means through a selected strap hole closest to said pin means, upon stretching of said strap from a clamped fish toward said foot.

19. A method of cleaning fish, comprising
providing a elongated table having opposite ends and a clamp mounted on said table at a position in substantial spaced relation from both ends of the table,
inserting the tail of a fish to be cleaned into said clamp,
supporting said fish on the table on one side of said clamp,
cleaning one side of said fish,
cleaning the other side of said fish, and
releasing the fish carcass from said clamp,
providing a fish retention strap having a hook at one end and length adjustable coacting fastening means on said table and strap,
inserting said hook into the mouth of a fish,
hooking the jaw of the fish and thereby supporting said fish on said strap,
lowering said hooked fish into said clamp,
providing a flip arm pivotally connected to said table adjacent said clamp,
stretching said strap toward the free end of said flip arm and fastening said strap to said flip arm,
pivoting said flip arm to one side of said clamp for positioning the fish on one side of the table while cleaning one side, and
pivoting the flip arm to the other side of said clamp for positioning the fish on the other side of the table while cleaning the other side.

20. The method of claim 19 further comprising,
stretching said strap toward one end of said table and fastening said strap to the table for securing the fish while cleaning one side,
disengaging said fastening means,
stretching said strap toward the opposite end of said table after flipping said clamped fish, and fastening said strap to the table for securing the fish while cleaning the other side,
lifting the cleaned carcass with said strap while opening said clamp, and
disengaging said strap hook from the cleaned carcass.

21. The method of claim 20 wherein cleaning one side of the fish comprises,
cutting into the fish adjacent the head and cutting toward the tail to separate the edible portion of the fish from the back bones,
flipping said separated portion onto said table on the other side of said clamp and,
cutting the previously separated edible portion from the skin still attached to the carcass.

22. The method of claim 21 wherein cleaning the other side of the fish comprises,
cutting into the fish adjacent the head and cutting toward the tail to separate the edible portion o the fish from the back bones,
flipping said seated portion onto said table on the opposite side of said clamp, and
cutting the previously seated edible portion from the skin still attached to the carcass.

23. The method of claim 20 wherein disengaging said strap hook includes pivoting said hook relative to the jaw of a fish such that said cleaned carcass falls from said hook without any direct handling of said cleaned carcass.

24. The method of claim 19 further comprising adjusting said flip arm to a generally vertical position to facilitate completing the cleaning of each side of a fish strapped to the flip arm.

* * * * *